March 31, 1936.  A. L. PARKER  2,035,978
FLEXIBLE FITTING FOR TUBES
Filed Feb. 23, 1934
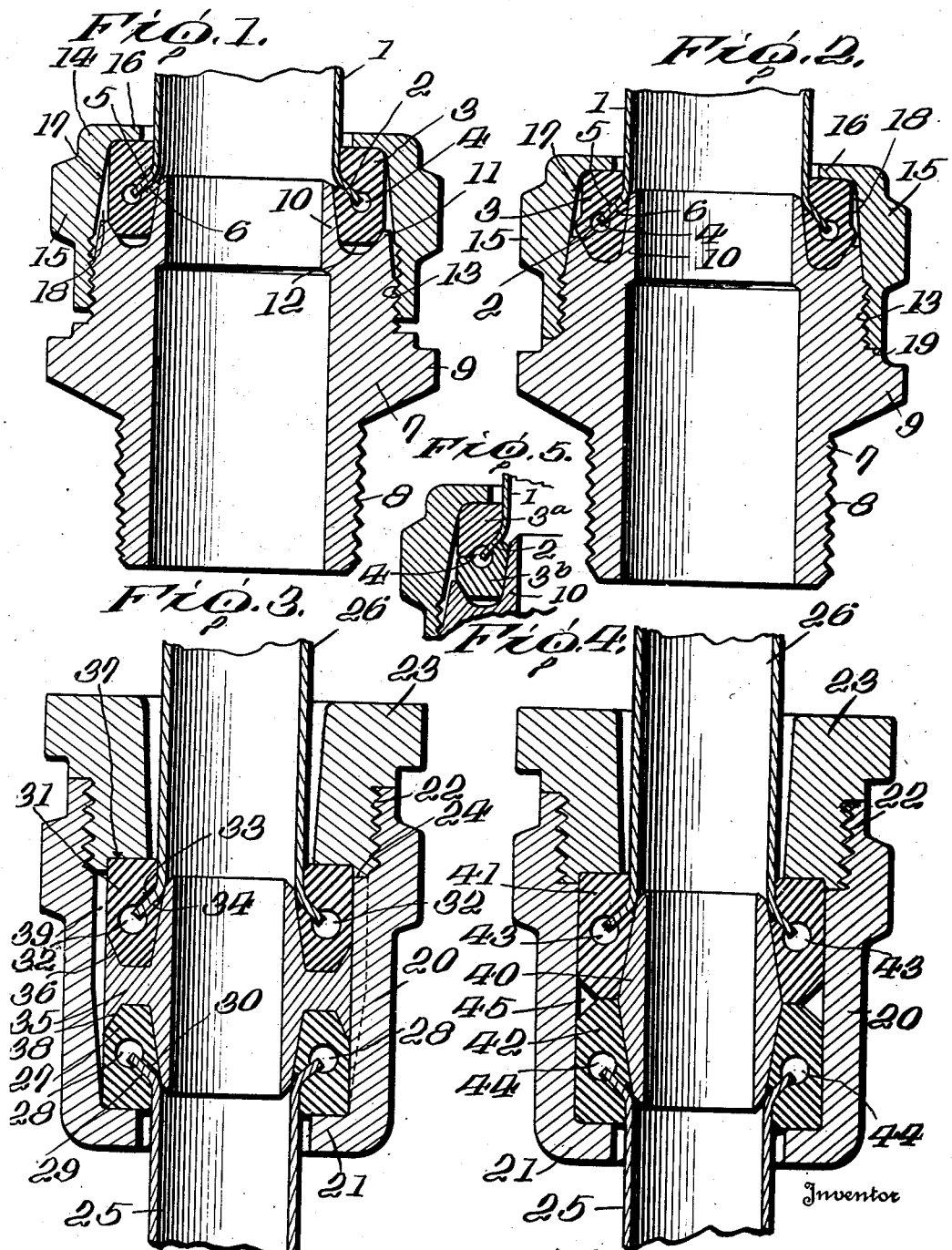
Inventor
Arthur L. Parker
By Sturtevant & Mason
Attorneys Patented Mar. 31, 1936

2,035,978

UNITED STATES PATENT OFFICE 2,035,978

FLEXIBLE FITTING FOR TUBES

Arthur L. Parker, Cleveland, Ohio

Application February 23, 1934, Serial No. 712,650

6 Claims. (Cl. 285—90)

The invention relates to new and useful improvements in a flexible fitting for tubes, and more particularly to a fitting which is adapted to clamp the flared end of a tube for connecting the same to some other part.

An object of the invention is to provide a fitting wherein flexible parts make sole contact with the flared end of the tube for the joining of the same to the coupling members, and wherein said flexible parts while gripped by the coupling members and clamping the tube end are capable of movement in the region of the clamped flared end of the tube, thus permitting the tube to flex easily without undue strain on the metal of the tube.

In the drawing—

Figure 1 is a longitudinal sectional view through a fitting embodying the improvements, showing the tube in place with the sections of the flexible member contacting with the flared end of the tube, but before said tube end is clamped to the fitting;

Fig. 2 is a similar view, but showing the coupling members as turned so as to cause the flexible parts to grip the flared end of the tube;

Fig. 3 is a view showing the improvement applied to a coupling for joining the ends of two tubes;

Fig. 4 is a view similar to Fig. 3, but showing a slightly modified form of clamping means for compressing the flexible parts for forcing the same into gripping contact with the flared ends of the tubes to be connected, and Fig. 5 is a detail in longitudinal section through a coupling showing a slightly modified form of flexible means for clamping the tube end.

The flexible fitting as shown in Figures 1 and 2 is for the purpose of connecting the flared end of a tube to another part. The tube is indicated at 1, and said tube has the end thereof flared as indicated at 2. The flaring of the tube may be accomplished in any desired way. A flexible member 3 is then placed in the tube. This flexible member is in the form of a ring having an annular recess 4 therein, preferably circular in cross section, and leading from said recess is an annular slot which opens at the inner face of the ring midway between the inner and outer faces of the ring. This slot provides opposed faces 5 and 6, which are the clamping faces of the flexible parts that contact with the opposite faces of the flared end of the tube. The ring thus formed is placed on the flared end of the tube, and said flared end will extend along the slot and into the recess 4 at the inner end of the annular slot. This recess 4 is of a greater diameter than the thickness of the flange.

The coupling members as shown in Figures 1 and 2, include a male member 7 having a thread 8 by which said coupling member may be joined to any desired part. This male member 7 is provided with flat portions 9 whereby it may be held from turning. It is also provided with a projecting portion 10, the outer face of which is tapered slightly. Said coupling member is also provided with a projecting portion 11, and between this projecting portion 11 and the portion 10 is a recess 12. The flexible member 3 has the inner face thereof substantially shaped to conform to the outer tapered face of the portion 10. The outer face of the flexible member 3 is also tapered to conform to the inner tapered face of the projecting portion 11. This flexible member 3 is so dimensioned that when initially placed on the projecting portion 10 it fits in a recess 12, but does not quite fill said recess. The male member 7 is provided with a thread 13 which is adapted to receive a threaded female coupling member 14 having flat sides 15 whereby it may be turned. This female coupling member has an inwardly extending flange 16 provided with an opening adapted to receive the tube. This opening is considerably larger than the tube. The female coupling member is first placed on the tube, and then the end of the tube is flared and the flexible member 3 attached thereto. The inner face of the female coupling member 14 is tapered slightly as indicated at 17, and the flexible member 3 is so dimensioned that when the flange 16 of the female coupling member is brought into light contact with the outer face of the flexible member, there will be a recess 18 between the outer face of the flexible member and the inner tapered face 17 of the female coupling member.

After the parts have been assembled as shown in Fig. 1, then the female coupling member 14 is threaded on to the male member as shown in Fig. 2, and this will cause the flange 16 to force the flexible member to the bottom of the recess 12, and also force the opposite faces 5 and 6 of the slot in the flexible member into intimate contact with the inner and outer faces of the flared end of the tube. When the female coupling member is turned on to the male member to the limit, due to the inner end thereof contacting with the shoulder 19 on said male member, there is still a recess or space 18 between this flexible member and the inner wall or tapered face 17 of the female member. The projecting portion 10 of the male member is brought into contact with the tube so that any fluid being conveyed through the tube does not contact with the flexible member. This, however, is not a clamping contact between the tube and the male member. The sole clamping contact between the fitting and the tube is through this flexible member which is forced into firm gripping contact with the opposite faces of the flared end of the tube. The recess formed between the coupling members which receives the flexible member is so dimensioned that the degree of compression of this flexible member and the clamping action thereof on the tube end, is such that the tube may flex easily without undue strain on the metal of the tube. Thus the vibrations imparted to the tube are absorbed and the breaking of the tube prevented. This easy flexing of the tube is due to the fact that the flexible member in the region of the flared end of the tube is capable of limited movement. The flexible member will re-shape itself, owing to the presence of the recess 18, without releasing in any way its gripping hold on the flared end of the tube. The purpose of the recess 4 at the end of the flare is to prevent abrasion of the flexible member, due to the movement of the end of the tube under vibration.

In Fig. 3 there is shown the application of the invention to the joining of two pipes so that either pipe may flex in the coupling. In this form of the invention, there is a female coupling member 20 with an inwardly extending retaining flange 21 and an internal thread 22. The male member 23 is threaded to engage this internal thread on the female member, and is provided with a shoulder 24 which contacts with a shoulder on the female member. The flange 21 of the female member has an opening therethrough to receive the tube 25. Said opening is larger in diameter than the tube so that the tube may be free from contact with the metal of the female member. The male member 23 is provided with an opening therethrough to receive the tube 26, and this opening is of larger diameter than the diameter of the tube so as to permit free movement of the tube without contact with the metal of the male member 23. The tube 25 is flared after it has been inserted through the opening in the female member, and then the flexible member 27 is attached thereto. This flexible member is preferably of rubber, and is ring-shaped. It has an annular recess 28 with a slot leading therefrom to the inner face of the ring, and providing opposed clamping faces 29 and 30 which are adapted to engage the opposite faces of the flared end of the tube. The extreme portion of the flared end of the tube extends into the recess 28.

After the tube 26 has been inserted in the male member 23, a flexible ring member 31, preferably of rubber, and similar in construction to the ring member 27, is attached to the flange of said tube 26. This flexible member 31 is provided with an annular recess 32, and a slot having opposed clamping faces 33 and 34. Before the male member is attached to the female member, a tubular insert 35 of metal is placed in the female member and in engagement with the flexible member 27. The male member is then threaded into the female member, and the flexible member 31 seated against this insert 35. The insert 35 is provided with a recess 36 which conforms to the outer end of the flexible member 31. The male member 23 is provided with a recess 37 which receives the outer end of the flexible member 31. There is a recess 38 in the insert which receives the inner end of the flexible member 27. There are longitudinal grooves 39 formed in the wall of the female member, which grooves are of considerable width and provide a space which will allow a re-shaping of the flexible members after they are firmly clamped against the tube ends. These grooves serve the same purpose as the recess 18 described in connection with Fig. 1.

The metal insert 35 is of sufficient length so that it extends into both tubes and contacts therewith so as to prevent any fluid passing through the tubes coming in contact with the flexible members. This contact, however, between the insert and the tubes is not a clamping action joining a tube to the coupling members. The tubes are attached to the coupling members solely through the clamping action of the flexible members thereon when the male member is screwed into the female member to a point limited by the shoulder 24. The dimensioning of the recesses which house these flexible members is such that there will be a firm clamping of the flared ends of the tubes of these two clamping members, and thus the two tubes are connected together through the clamping action of the coupling members on the flexible members. The tubes are free to vibrate or flex without restraint from contact with any metal parts, the recesses 39 permitting movement of the material of the flexible member in the region where the tube ends are clamped.

In Fig. 4 there is shown a structure for joining two tubes which is slightly different from that shown in Fig. 3. The female member 20 and the male member 23 are of the same structure, and they are joined by a threaded connection 22 therebetween. The metal insert is formed differently. This insert as indicated at 40 has outer tapered faces and is of sufficient length so that it extends into the two tubes contacting therewith in the manner described in connection with the insert 35. The flexible member 41 which is attached to the tube 26 has its inner and outer faces shaped so as to contact with the outer wall of the insert 40 and the inner wall of the female member, respectively. The same is true of the flexible member 42 which is connected to the pipe 25. The flexible member 41 has a recess 43 and the flexible member 42 has a recess 44. There are slots leading in from these recesses providing clamping faces which firmly grip the flared ends of the respective tubes. The two flexible members are abutted, but are shaped so as to provide a recess 45. This recess permits of a movement of the material forming the flexible members while said members are still held in gripping contact with the flared end of the tubes. It is due to this recess 45 that the tubes may flex easily, causing a movement of the material of the flexible members in the region where said members grip the flared ends of the tubes.

In Fig. 5 of the drawing, the flexible member 3 is shown as formed in two sections 3a and 3b. The member is parted along a line which intersects the recess 4. This aids slightly in the assembling of the parts. The coupling otherwise is precisely the same as shown in Figures 1 and 2. It is to be understood that the flexible parts which engage the flared end of the tube may be parts of one integral structure or parts of two separate members contacting with each other, and reference to a flexible member or flexible parts throughout the description and claims is intended, therefore, to cover either form, one being the full equivalent of the other.

It is obvious that many changes may be made in the shaping of the coupling members, and also in the shaping of the flexible members which are attached to the tubes. The essential features consist in the utilizing of the flexible member as the sole means for securing the metal tubes to the metal couplings, and the clamping of these flexible members in such a way as to permit the easy flexing of the tubes when subjected to vibrations.

Having thus described the invention, what I claim as new and desire to secure by Letters Patent, is—

1. A flexible fitting for tubes having the end thereof tapered comprising flexible parts adapted to contact with the opposite faces of the flared end of the tube, a metal coupling having a recess adapted to receive said flexible parts, said coupling being constructed and said recess dimensioned so as to completely house said flexible parts and prevent fluid passing through the tube from contacting therewith, means whereby the recess may be diminished in size and the flexible parts forced into firm gripping contact with the opposite faces of the tube end, said flexible parts serving as the sole means for connecting the tube to the metal coupling, said recess and flexible parts being shaped to permit easy flexing of the tube without releasing the clamping action of said flexible parts thereon.

2. A flexible fitting for tubes including spaced flexible parts adapted to contact with the opposite faces of the flared end of a tube, metal coupling members having therebetween a recess adapted to receive said flexible parts, said recess being dimensioned so that the coupling members may be caused to grip said flexible parts and force the same into firm gripping contact with the opposite faces of the tube end, said flexible parts serving as the sole means for connecting the tube to the coupling members, said recess and flexible parts being shaped to permit easy flexing of the tube without releasing the clamping action of said flexible parts thereon one of said coupling members having a projecting portion extending into the tapered end of the tube and contacting therewith for housing the flexible parts.

3. A flexible fitting for tubes including a ring-shaped flexible member having a groove extending from the inner face of said ring-shaped member into the body thereof and forming clamping faces adapted to contact with the opposite faces of the flared end of a tube, metal coupling members having therebetween a recess adapted to receive said flexible member, said recess being dimensioned so that the coupling members may be caused to grip said flexible member and force sections of said flexible member into firm gripping contact with the opposite faces of the tube end, said flexible member serving as the sole means for connecting the tube to the coupling members, said recess and flexible member being shaped to permit easy flexing of the tubes without releasing the clamping action of said flexible member thereon one of said coupling members having a projecting portion extending into the tapered end of the tube and contacting therewith for housing the flexible member.

4. A flexible fitting for tubes including a ring-shaped flexible member having a groove extending from the inner face of said ring-shaped member into the body thereof and forming clamping faces adapted to contact with the opposite faces of the flared end of a tube, said flexible member having an annular recess at the inner end of said groove for housing the outer end of the flared portion of the tube, metal coupling members having therebetween a recess adapted to receive said flexible member, said recess being dimensioned so that the coupling members may be caused to grip said flexible member and force sections of said flexible member into firm gripping contact with the opposite faces of the tube end, said flexible member serving as the sole means for connecting the tube to the coupling members, said recess and flexible member being shaped to permit easy flexing of the tubes without releasing the clamping action of said flexible member thereon one of said coupling members having a projecting portion extending into the tapered end of the tube and contacting therewith for housing the flexible member.

5. A flexible fitting for tubes including a flexible member having spaced sections adapted to contact with the opposite faces of the flared end of a tube, metal coupling members having therebetween a recess adapted to receive said flexible member, said recess being dimensioned so that the coupling members may be caused to grip said flexible member and force sections of said flexible member into firm gripping contact with the opposite faces of the tube end, one of said coupling members having a projecting portion extending into the tube and contacting therewith for housing the flexible member, said flexible member serving as the sole means for connecting the tube to the coupling members, said recess and flexible member being shaped to permit easy flexing of the tube without releasing the clamping action of said flexible member thereon.

6. A flexible fitting for tubes including a flexible member for each tube, said flexible members having spaced sections adapted to contact with the opposite faces of the flared end of the tube with which it is associated, metal coupling members having therebetween a recess adapted to receive both of said flexible members for joining the two tubes, and a metal insert disposed within said coupling and between the ends of the tubes and making contact therewith for housing and protecting the flexible members, said recess being dimensioned so that the coupling members may be caused to grip said flexible members and force the sections thereof into firm gripping contact with the opposite faces of the end with which the flexible members are associated, said flexible members serving as the sole means for connecting the tubes to the coupling members, said recess and said flexible members being shaped to permit easy flexing of either tube without releasing the clamping action of said flexible members thereon.

ARTHUR L. PARKER.